US012519854B2

(12) United States Patent
Shoji et al.

(10) Patent No.: US 12,519,854 B2
(45) Date of Patent: Jan. 6, 2026

(54) STORAGE SYSTEM AND METHOD FOR TRANSFERRING DATA THEREOF

(71) Applicant: Hitachi, Ltd., Tokyo (JP)

(72) Inventors: Tomoki Shoji, Tokyo (JP); Masanori Takada, Tokyo (JP); Katsuya Tanaka, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 1 day.

(21) Appl. No.: 18/603,641

(22) Filed: Mar. 13, 2024

(65) Prior Publication Data

US 2024/0406264 A1 Dec. 5, 2024

(30) Foreign Application Priority Data

May 31, 2023 (JP) ................................. 2023-089944

(51) Int. Cl.
*H04L 12/24* (2006.01)
*H04L 41/0803* (2022.01)
*H04L 49/9047* (2022.01)
*H04L 67/1097* (2022.01)

(52) U.S. Cl.
CPC ...... *H04L 67/1097* (2013.01); *H04L 49/9047* (2013.01)

(58) Field of Classification Search
CPC .......................... H04L 67/1097; H04L 49/9047
USPC ......................................................... 709/212
See application file for complete search history.

(56) References Cited

U.S. PATENT DOCUMENTS

| 10,225,750 | B2 * | 3/2019 | Yamada | H04W 52/02 |
| 10,846,013 | B1 * | 11/2020 | Park | G06F 3/0673 |
| 11,550,736 | B1 * | 1/2023 | Xu | G06F 13/1668 |
| 2005/0097273 | A1 * | 5/2005 | Kanai | G06F 3/0613 |
| | | | | 711/147 |
| 2006/0140008 | A1 * | 6/2006 | Hirako | G06F 3/0656 |
| | | | | 365/185.22 |
| 2013/0254487 | A1 * | 9/2013 | Tanaka | G06F 11/2017 |
| | | | | 711/123 |
| 2015/0058658 | A1 * | 2/2015 | Izuta | G06F 11/2007 |
| | | | | 714/57 |
| 2015/0160860 | A1 * | 6/2015 | Kwon | G06F 3/0688 |
| | | | | 711/104 |
| 2020/0226078 | A1 * | 7/2020 | Tanaka | G06F 12/0806 |
| 2021/0365397 | A1 * | 11/2021 | Tanaka | G06F 3/061 |

(Continued)

FOREIGN PATENT DOCUMENTS

| JP | 2015-501957 A | 1/2015 |
| JP | 2022-164414 A | 10/2022 |

*Primary Examiner* — Moustafa M Meky
*Assistant Examiner* — Elizabeth Kassa
(74) *Attorney, Agent, or Firm* — Foley & Lardner LLP

(57) ABSTRACT

A storage system includes a plurality of storage controllers. The storage controller includes a processor, a memory, and a transfer device that processes control data for controlling an internal operation of the storage system, the control data being transmitted and received between the plurality of storage controllers. The processor accumulates the control data in the memory when a transfer request for the control data is generated, generates a write request for transmitting a plurality of the control data stored in the memory, and transmits the write request to the other storage controller. The transfer device writes a plurality of the control data included in the write request to the memory upon receiving the write request.

9 Claims, 11 Drawing Sheets

(56) References Cited

U.S. PATENT DOCUMENTS

2022/0182340 A1* 6/2022 Kawamura ......... H04L 49/9047
2022/0337532 A1  10/2022 Tanaka et al.

* cited by examiner

STORAGE SYSTEM AND METHOD FOR TRANSFERRING DATA THEREOF

CLAIM OF PRIORITY

The present application claims priority from Japanese patent application JP 2023-089944 filed on May 31, 2023, the content of which is hereby incorporated by reference into this application.

BACKGROUND OF THE INVENTION

1. Field of the Invention

The present invention relates to a data transfer technology for a storage system including a plurality of storage controllers.

2. Description of the Related Art

In the storage system, by connecting a plurality of storage controllers, it is possible to implement high-speed processing by parallel operation and availability improvement by data redundancy. Hereinafter, the storage controller is simply referred to as a controller.

The plurality of controllers share and use the memory of each controller in order to share data. The shared memory is directly accessed from a processor of another controller (another system controller).

JP 2015-501957 A discloses that a shared memory is implemented by connecting controllers using PCIe (PCIe and PCI Express are registered trademarks, and the same applies hereinafter) which is one of communication network standards.

PCIe is generally used as a communication standard for connecting between controllers. Although PCIe can improve the bandwidth by upgrading the technology generation, in recent years, there is a problem that it is difficult to maintain the quality of transmission in a long distance as the generation of PCIe is updated.

As communication standards capable of long-distance transmission, RDMA over Converged Ethernet (Ethernet is a registered trademark) (RoCE) and Infiniband exist. JP 2022-164414 A describes a technique for implementing remote direct memory access (RDMA) between controllers using RoCE to enable memory access.

SUMMARY OF THE INVENTION

In terms of storage workload, control data having a small size of about 2 B to 64 B is transmitted and received between the controllers. In RDMA data transfer such as Ethernet, the performance of a transmission path deteriorates in a workload that repeats data transfer of a small size. The present invention improves the throughput of RDMA when a large number of small control data transfers occur in a storage system in which controllers are connected via a transmission path such as Ethernet.

A representative example of the invention disclosed in the present application is as follows. That is, a storage system includes a plurality of storage controllers. The storage controller includes a processor, a memory, and a transfer device that processes control data for controlling an internal operation of the storage system, the control data being transmitted and received between the plurality of storage controllers. The processor accumulates the control data in the memory when a transfer request for the control data is generated, generates a write request for transmitting a plurality of the control data stored in the memory, and transmits the write request to the other storage controller. The transfer device writes a plurality of the control data included in the write request to the memory upon receiving the write request.

According to the present invention, since a plurality of control data are collectively transferred, the throughput of RDMA can be improved. This makes it possible to improve the performance of the storage system. Problems, configurations, and effects other than those described above will be clarified by the following description of embodiments.

DESCRIPTION OF THE PREFERRED EMBODIMENTS

Figure 1:
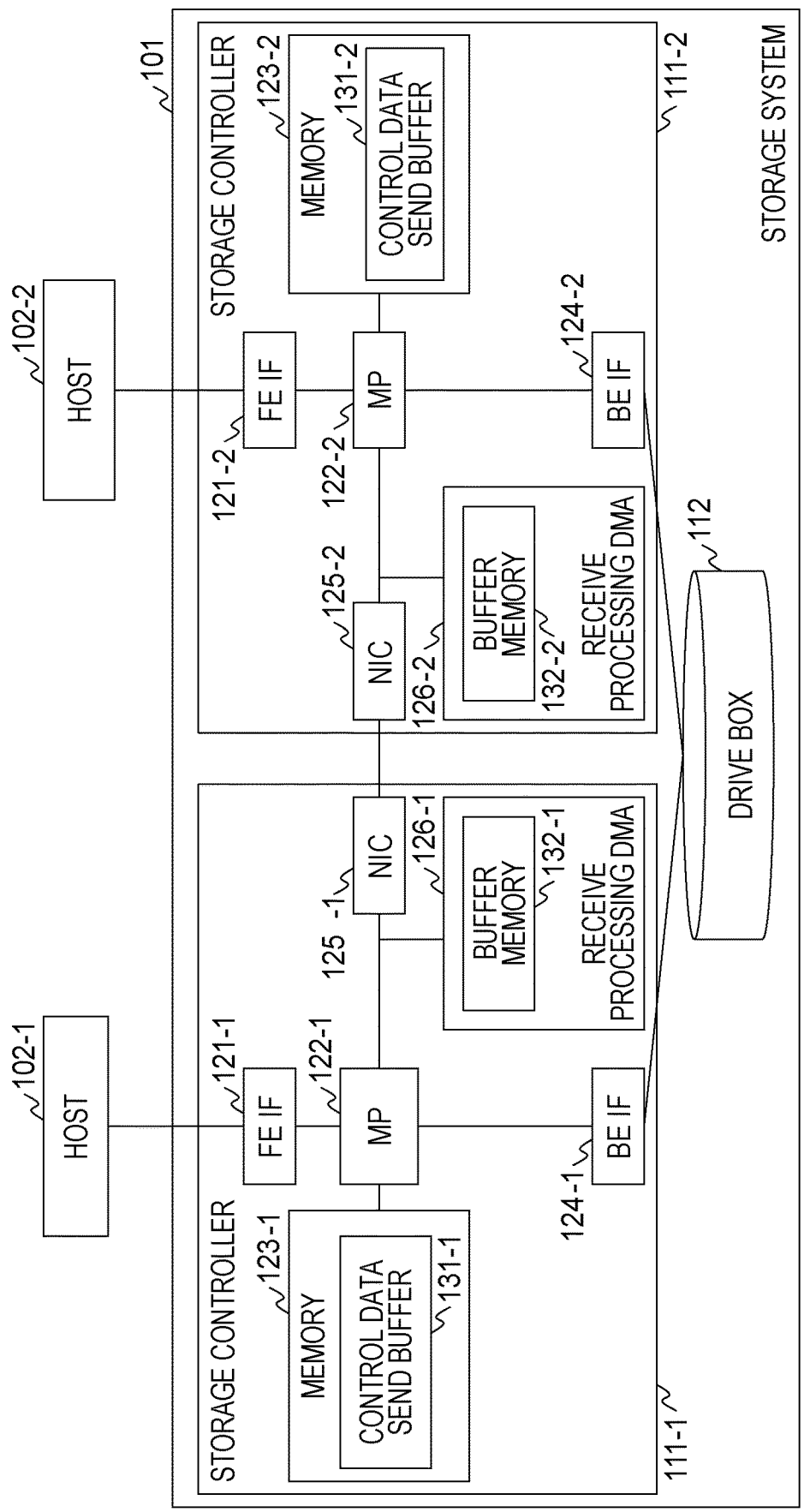
FIG. 1 is a diagram illustrating an example of the configuration of a storage system according to a first embodiment.

Hereinafter, embodiments of the present invention will be described with reference to the accompanying drawings. However, the present invention is not to be construed as being limited to the description of the following embodiments. Those skilled in the art can easily understand that the specific configuration can be changed without departing from the spirit or gist of the present invention.

In the configurations of the invention described below, the same or similar configurations or functions are denoted by the same reference numerals, and a redundant description is omitted.

Notations such as "first", "second", and "third" in the present specification are attached to components to identify the components, and do not necessarily limit the number or order.

First Embodiment

FIG. 1 is a diagram illustrating an example of the configuration of a storage system according to the first embodiment.

A storage system 101 according to the first embodiment is characterized in that receive processing DMAs 126 that process the control data transmitted and received between storage controllers 111 are mounted in the storage controllers 111. Detailed configurations will be described below.

A host 102 is a computer device that transmits a data read command and a data write command to the storage system 101 based on a user operation or an operation such as application software. Note the following. The host 102 may be a virtual computer device such as a virtual machine.

Referring to FIG. 1, one host 102 is connected to one storage controller 111, but a plurality of hosts 102 may be connected to one storage controller 111.

The storage system 101 includes two storage controllers 111 and a drive box 112.

The storage system 101 has a dual controller configuration in which the two storage controllers 111 are mounted. In the storage system 101 having the dual controller configuration, transfer of user data and control data mainly occurs between the storage controllers 111. The user data is data written from the host 102 to the storage system 101 and is transferred between the storage controllers 111 by duplication or the like for the purpose of data protection. The control data is data for controlling the internal operation of the storage system 101 and is data having a short transfer length of about 64 B.

The drive box 112 accommodates one or more types of large-capacity nonvolatile storage devices such as a hard disk and a solid state drive (SSD). The drive box 112 provides a physical storage area for reading and writing data according to a write command and a read command transmitted from the host 102.

The storage controller 111 includes a front-end interface (FE IF) 121, a processor (MP) 122, a memory 123, a back-end interface (BE IF) 124, an NIC 125, and the receive processing DMA 126.

The FE IF 121 connects the host 102 and the storage system 101. The FE IF 121 converts a data transfer protocol between the host 102 and the storage controller 111 and a data transfer protocol in the storage controller 111.

The host 102 and the FE IF 121 are connected via a transmission line such as a fiber channel cable and an Ethernet cable. Note that the host 102 and the FE IF 121 may be connected via a storage area network including a plurality of transmission lines and a plurality of switches.

The BE IF 124 connects the storage controller 111 and the drive box 112. The BE IF 124 converts a data transfer protocol in the storage controller 111 and a data transfer protocol between the storage controller 111 and the drive box 112.

When the storage device accommodated in the drive box 112 is a PCIe-connected NVMESSD, the BE IF 124 is a PCIe switch that does not perform protocol conversion.

The MP 122 controls data transfer between the host 102 connected via the FE IF 121 and the drive box 112 connected via the BE IF 124. Further, the MP 122 controls data transfer between the storage controllers 111.

The memory 123 is a main storage device used by the MP 122 and stores information such as a program (for example, a storage control program) executed by the MP 122 and a management table referred to by the MP 122.

The memory 123 is also used as a cache memory of the storage controller 111. The memory 123 includes a control data send buffer 131 for temporarily storing control data to be transmitted to another storage controller 111.

In the memory 123, an area for storing user data and an area for storing control data are separated, and whether the data to be transmitted to the other storage controller 111 is user data or control data can be determined by a transmission destination address.

The NIC 125 has an interface capable of RDMA according to the Ethernet standard, for example, and connects between the MPs 122 of the respective storage controllers 111. The NIC 125 is connected to the MP 122 of the own storage controller 111 via the PCIe bus.

RDMA is to transfer data from a memory of a transfer source node to a memory of a transfer destination node. RoCE is known as a protocol capable of RDMA on Ethernet.

The receive processing DMA 126 performs processing related to the reception of control data. The receive processing DMA 126 includes a buffer memory 132 therein and temporarily accumulates received control data in the buffer memory 123 until the control data is written in the memory 132. The receive processing DMA 126 is connected to the MP 122 via the PCIe bus. A detailed role and operation of the receive processing DMA 126 will be described later.

Figure 2:
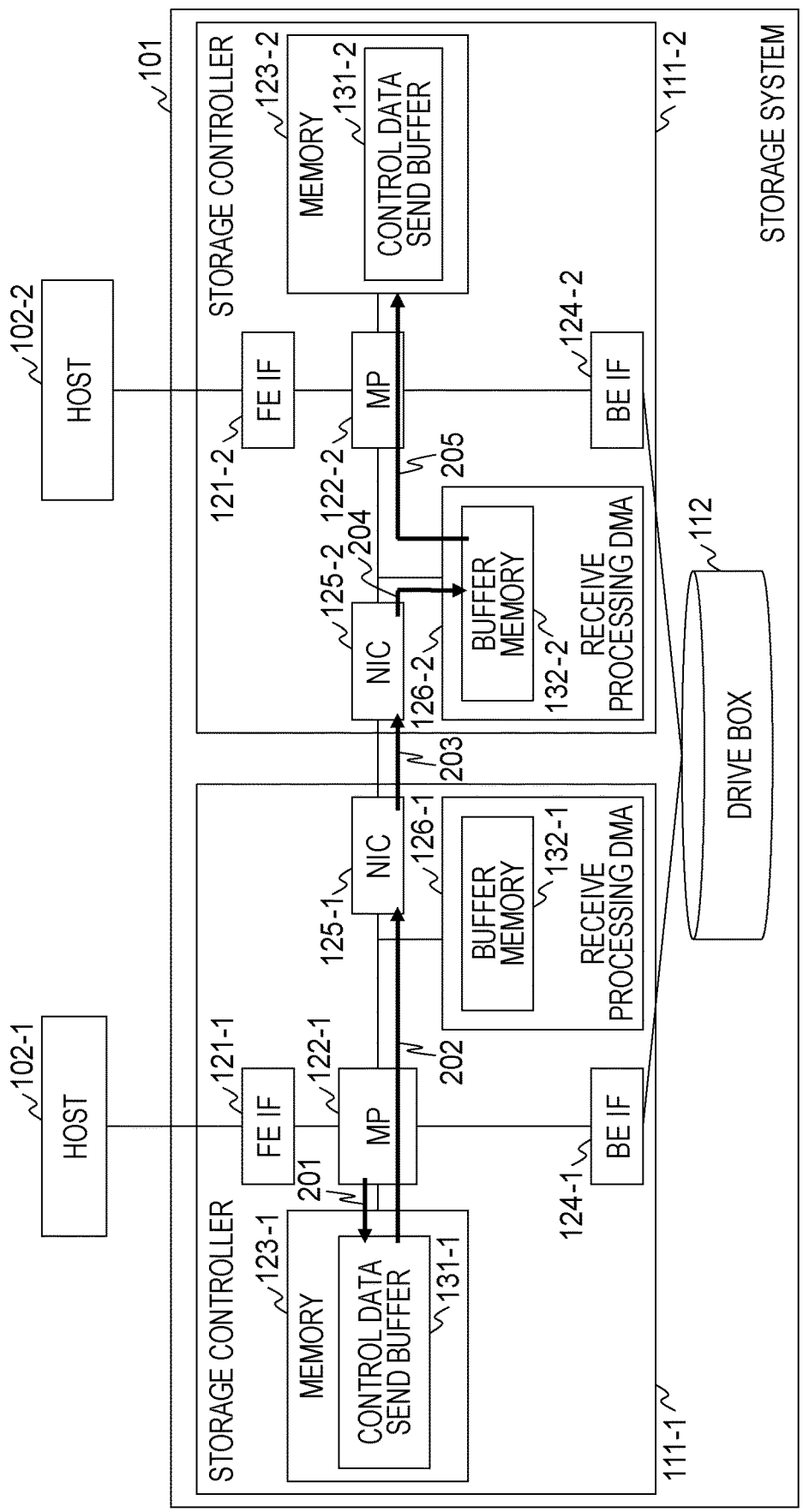
FIG. 2 is a diagram for explaining a control data transfer method in the storage system according to the first embodiment.

Next, a method of transferring control data between the storage controllers 111 will be described with reference to FIG. 2. FIG. 2 is a diagram for explaining a control data transfer method in the storage system 101 according to the first embodiment.

There are two types of control data transfer methods between the storage controllers 111.

(Transfer Method 1) The MP 122 directly designates the memory 123 of the storage controller at the transfer destination as the transfer destination address of the control data and issues a write request to the storage controller 111 at the transfer destination.

(Transfer Method 2) The MP 122 issues a write request including a plurality of control data to the receive processing DMA 126 of the storage controller 111 at the transfer destination.

FIG. 2 illustrates a control flow of (transfer method 2). The following is an example of a control flow in a case where control data is transferred from a storage controller 111-1 to a storage controller 111-2 is illustrated.

When a transfer request of control data is generated in the storage controller 111-1, an MP 122-1 stores the control data to be transferred in a control data send buffer 131-1 of the memory 123-1 (flow 201). The MP 122-1 performs control to transmit a write request including a plurality of control data.

An NIC 125-1 reads a plurality of control data stored in the control data send buffer 131-1 (flow 202). The NIC 125-1 transmits the read control data to an NIC 125-2 (flow 203).

The NIC 125-2 transfers the plurality of control data received from the NIC 125-1 to the buffer memory 132-2 of a receive processing DMA 126-2 (flow 204).

The receive processing DMA 126-2 writes the plurality of received control data in a memory 123-2 (flow 205).

Here, RoCE is assumed as an example of a protocol used by the NIC 125 for data transfer, and the format of a write request according to the first embodiment will be described with reference to FIGS. 3 and 4.

Figure 3:
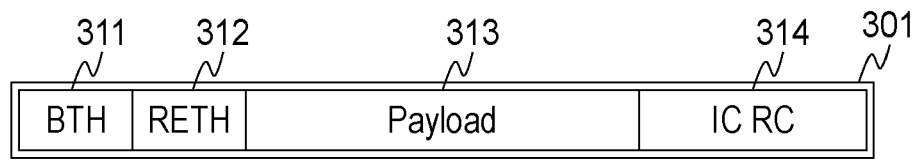
FIG. 3 is a diagram illustrating an example of the format of a write request according to the first embodiment.
Figure 4:
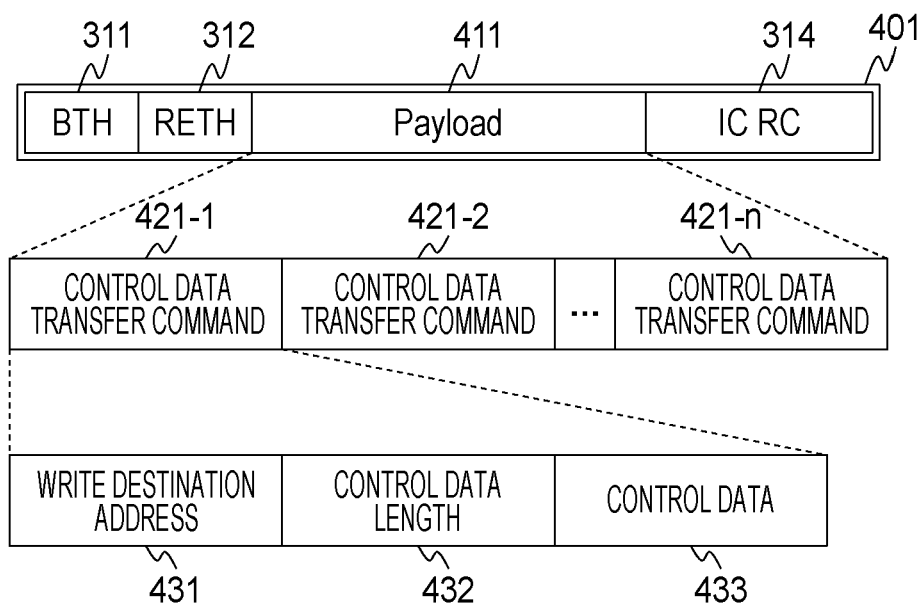
FIG. 4 is a diagram illustrating an example of the format of a write request according to the first embodiment.

FIGS. 3 and 4 are diagrams each illustrating an example of the format of a write request according to the first embodiment.

FIGS. 3 and 4 illustrate the format of a packet of a transport layer of the RoCE write request. Note that, since this is the packet format of the RoCE transport layer, headers used in layers lower than the transport layer, such as an IP header, are omitted.

A packet 301 includes a Base Transport Header (BTH) 311, an RDMA Extended Transport Header (RETH) 312, a Payload 313, and an ICRC 314. The packet 301 is used in the transfer processing of control data in transfer method 1.

Similarly to the packet 301, a packet 401 includes the BTH 311, the RETH 312, a Payload 411, and the ICRC 314. The packet 401 is used in the transfer processing of control data in transfer method 2.

The RETH 312 stores the information of the memory address of the write destination of data stored in the Payload 313 or the Payload 411.

The Payload 313 stores write data to be actually transmitted. The Payload 411 stores a plurality of control data. Specifically, the payload 411 includes a plurality of control data transfer commands 421 with a transfer length and a write destination address being added to one control data. Here, a combination of the plurality of control data transfer commands 421 is referred to as a control data transfer list. The control data transfer commands 421 are connected in the order of processing.

The control data transfer command 421 includes a write destination address 431, a control data length 432, and control data 433. The areas are aligned such that values are read in the order of the write destination address 431, the control data length 432, and the control data 433.

The write destination address 431 stores an address of the memory 123 to which the control data is written. The value stored at the write destination address 431 is a fixed length (for example, about 8 bytes).

The control data length 432 stores the length of the control data stored in the control data 433. The value stored in the control data length 432 is a fixed length (for example, about 2 bytes).

The control data 433 stores control data. The control data 433 can store control data of various lengths.

As described above, fixed length values are respectively stored in the write destination address 431 and the control data length 432, and control data of an arbitrary length is stored in the control data 433. The receive processing DMA 126 can write control data to the memory 123 by sequentially reading each value from the head of the control data transfer command 421.

The difference between the packet 301 and the packet 401 is the number of control data contained in Payload and the destination address specified in the RETH 312. The payload 313 of the packet 301 contains only one control data, while the payload 411 of the Packet 401 contains plurality of control data transfer commands 421. The RETH 312 of the packet 301 contains the address of memory 123 of the storage controller 111 at the transfer destination, and the RETH 312 of packet 401 contains the address of the buffer memory 132 of the receive processing DMA 126 in the storage controller 111 at the transfer destination.

When receiving the packet 401, the receive processing DMA 126 writes the control data included in each control data transfer command 421 stored in the Payload 411 to the memory 123.

Next, an operation procedure of the storage controller 111 in a control data transfer process will be described with reference to FIGS. 5 and 6.

Figure 5:
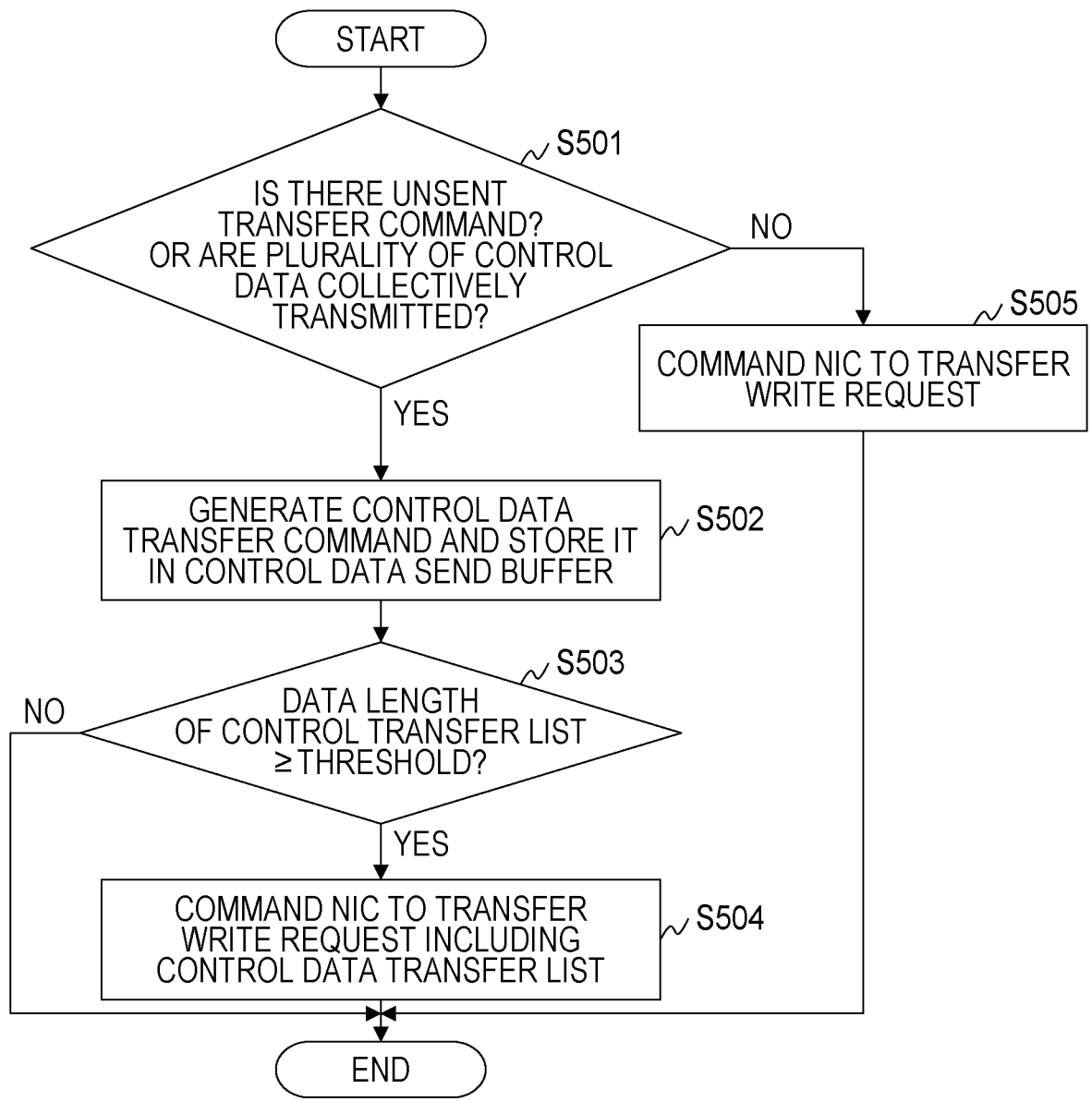
FIG. 5 is a flowchart illustrating an example of the processing executed by a storage controller as the transfer source of control data according to the first embodiment.

FIG. 5 is a flowchart illustrating an example of the processing executed by the storage controller 111 as the transfer source of control data according to the first embodiment.

In a case where a control data transfer request is generated, the storage controller 111 executes processing described below.

The MP 122 determines whether there is an unsent control data transfer command 421 in the control data send buffer 131 or whether it is necessary to collectively transmit a plurality of control data (step S501).

For example, the MP 122 checks the utilization rate of the network between the storage controllers 111 and determines that it is necessary to collectively transmit a plurality of control data when the utilization rate is high. It is assumed that the MP 122 determines that the utilization rate is high when the utilization rate is larger than a threshold.

When there is no unsent control data transfer command 421 in the control data send buffer 131 and it is not necessary to collectively transmit a plurality of control data, the MP 122 generates the packet 301 for transferring one control data as a write request and instructs the NIC 125 to transfer the write request (step S505). Thereafter, the MP 122 ends the processing.

The address of the memory 123 of the storage controller 111 at the transfer destination is stored in the RETH 312 of the packet 301.

When the utilization rate of the network is low, that is, when there is a margin in the bandwidth between the storage controllers 111, there is no need to improve the throughput. Therefore, the storage controller 111 transfers control data to another storage controller 111 without accumulating the control data. In this case, the storage controller 111 at the transfer destination writes the received control data in the memory 123. As a result, the latency of control data transfer can be improved.

When the unsent control data transfer command 421 exists in the control data send buffer 131 or the plurality of control data need to be collectively transmitted, the MP 122 generates the control data transfer command and stores the control data transfer command 421 in the control data send buffer 131 (step S502). At this time, the MP 122 connects the control data transfer command 421 to the end of the control data transfer list.

The MP 122 determines whether or not the data length of the control data transfer list is a threshold value or more (step S503).

When the data length of the control data transfer list is smaller than the threshold value, the MP 122 ends the processing. As described above, the MP 122 does not transfer the control data until the data length of the control data transfer list becomes equal to or greater than the threshold value. Note that a predetermined waiting time may be provided for the transfer of the control data transfer list, and even if the data length of the control data transfer list does not reach the threshold in step S503, the control data transfer list may be transferred in a case where the predetermined time has elapsed.

When the data length of a control data transfer list is equal to or greater than the threshold, the MP 122 generates the packet 401 for transferring a plurality of control data as a write request and instructs the NIC 125 to transfer the write request (step S504). Thereafter, the MP 122 ends the processing.

The address of the buffer memory 132 of the receive processing DMA 126 of the storage controller 111 at the transfer destination is stored in the RETH 312 of the packet 401.

Figure 6:
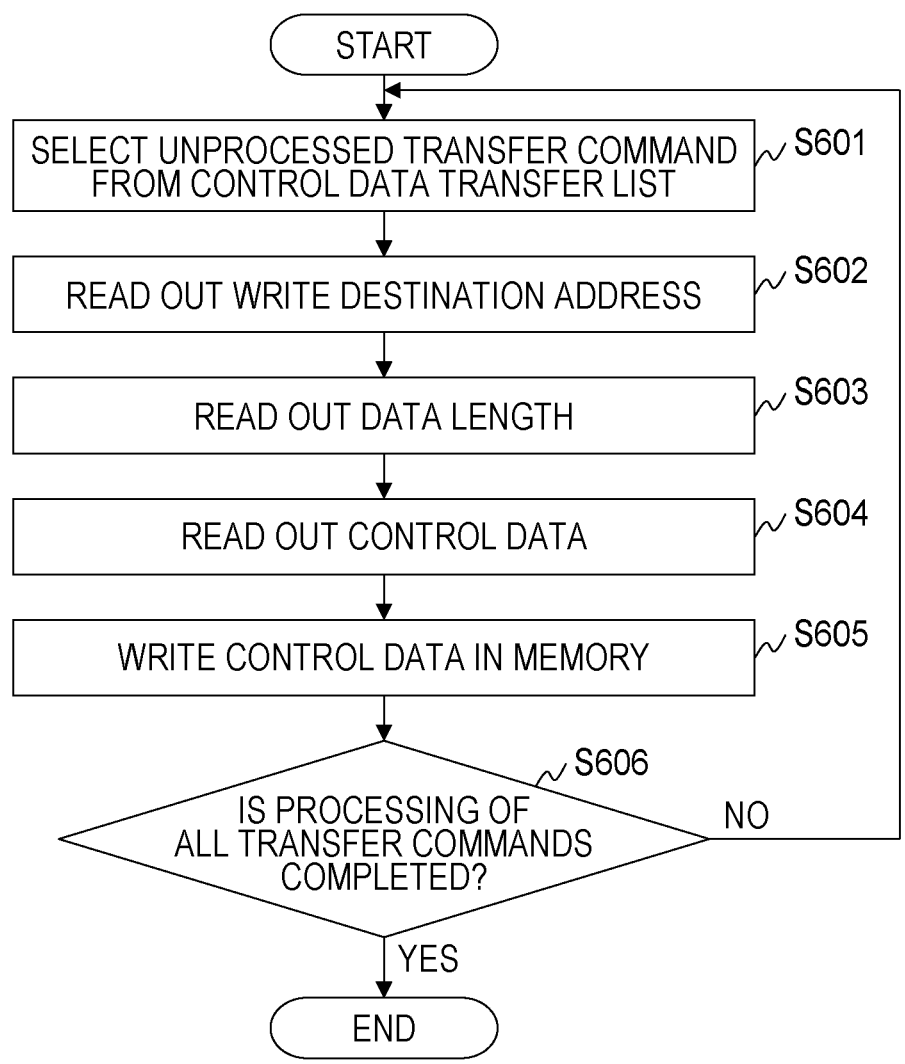
FIG. 6 is a flowchart illustrating an example of the processing executed by a storage controller of the transfer destination of control data according to the first embodiment.

FIG. 6 is a flowchart illustrating an example of the processing executed by the storage controller 111 at the transfer destination of the control data according to the first embodiment. Here, the processing executed by the receive processing DMA 126 that has received the packet 401 from the NIC 125 will be described. When the packet 401 is transferred to the buffer memory 132, the receive processing DMA 126 starts the processing described below.

The receive processing DMA 126 selects one unprocessed control data transfer command 421 from the control data transfer list stored in the payload 411 of the packet 401 (step S601).

Specifically, the receive processing DMA 126 selects the control data transfer command 421 sequentially from the head of the control data transfer list stored in the payload 411. At this time, the receive processing DMA 126 sets the pointer to the address of the head (head address) of the selected control data transfer command 421.

The receive processing DMA 126 reads the value of the write destination address 431 of the selected control data transfer command 421 (step S602).

Specifically, since the write destination address 431 has a fixed length, the receive processing DMA 126 reads a value in the range of an address (first address) obtained by adding the fixed length to the address from the head address. At this time, the receive processing DMA 126 sets the pointer to the first address.

The receive processing DMA 126 reads the value of the control data length 432 of the selected control data transfer command 421 (step S603).

Specifically, since the control data length 432 has a fixed length, the receive processing DMA 126 reads a value in the range of an address (second address) obtained by adding the fixed length to the first address from the first address. At this time, the receive processing DMA 126 sets the pointer to the second address.

The receive processing DMA 126 reads the value of the control data 433 of the selected control data transfer command 421 (step S604).

Specifically, receive processing DMA 126 reads a value in the range of an address (third address) obtained by adding the data length acquired in step S603 from the second address to the second address. At this time, the receive processing DMA 126 sets the pointer to the third address.

The receive processing DMA 126 writes the control data in the memory 123 (step S605).

Specifically, the receive processing DMA 126 writes the control data read out in step S604 to the address read out in step S602.

In step S606, the receive processing DMA 126 determines whether the processing of all the control data transfer commands 421 stored in the Payload 411 is completed (step S606).

If the processing of all the control data transfer commands 421 is not completed, the receive processing DMA 126 returns to step S601 and executes similar processing. When the processing of all the control data transfer commands 421 is completed, the receive processing DMA 126 ends the processing.

As described above, the storage system 101 according to the first embodiment can improve the transfer efficiency of control data between the storage controllers 111 and can improve the throughput of the storage system 101.

Second Embodiment

In the second embodiment, a control data transfer method in a storage system constructed using a software defined storage (SDS) technology will be described. Here, the SDS is a method of configuring a storage node using a calculation resource on a general-purpose server by operating dedicated software on a general-purpose server.

Figure 7:
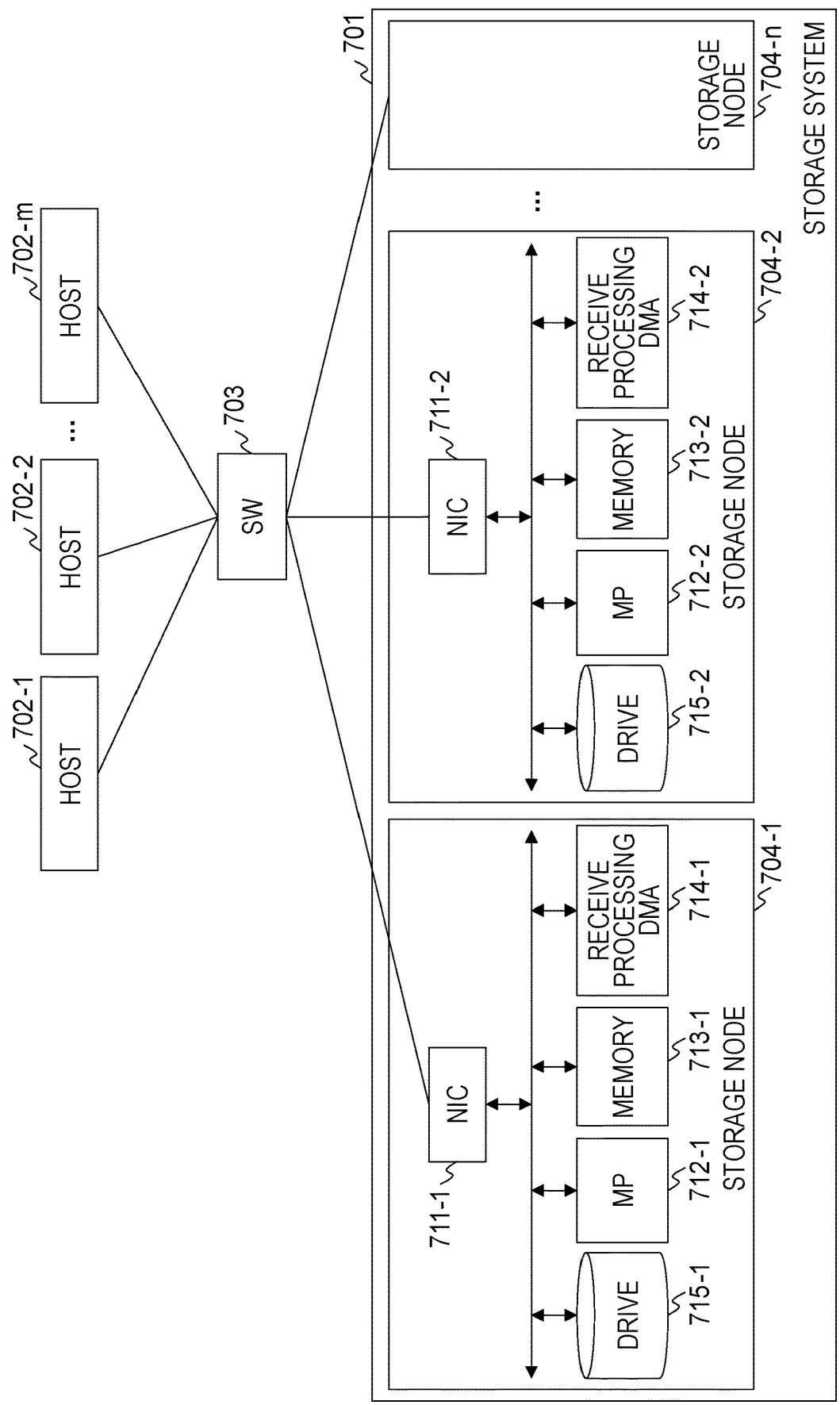
FIG. 7 is a diagram illustrating an example of the configuration of a storage system according to a second embodiment.

FIG. 7 is a diagram illustrating an example of the configuration of a storage system according to the second embodiment.

A storage system 701 includes a plurality of storage nodes 704 connected via a switch 703. Referring to FIG. 7, the number of switches 703 of the storage system 701 is one, but may be plural.

A host 702 is a computer device that transmits a data read command and a data write command to the storage node 704 via the switch 703 based on a user operation or an operation such as application software. Note the following. The host 702 may be a virtual computer device such as a virtual machine.

The switch 703 connects the plurality of hosts 702, the plurality of storage nodes 704, and the plurality of hosts 702 and the plurality of storage nodes 704. The switch 703 configures a network according to, for example, the Ethernet standard.

The storage node 704 is, for example, a physical server that provides a storage area for reading and writing data from and to the host 702, and includes an NIC 711, an MP 712, a memory 713, a receive processing DMA 714, and a drive 715.

The NIC 711 has an interface capable of RDMA according to the Ethernet standard, for example, and connects the storage node 704 and the switch 703. The NIC 711 is connected to the MP 712 via the PCIe bus.

The MP 712 controls data transfer between the host 702 and the storage node 704, data transfer between the storage nodes 704, and data read/write of the drive 715.

The memory 713 is a main storage device used by the MP 712 and stores information such as a program (for example, a storage control program) executed by the MP 712 and a management table referred to by the MP 712. The memory 713 includes a control data send buffer (not illustrated) for temporarily accumulating control data to be transmitted to another storage node 704.

The receive processing DMA 714 is, for example, a PCIe card that can be optionally attached to a general-purpose server and performs processing related to the reception of control data as in the first embodiment. The receive processing DMA 714 includes a buffer memory (not illustrated) that temporarily stores control data. The receive processing DMA 714 is connected to the MP 712 via the PCIe bus.

The drive 715 includes one or more types of large-capacity nonvolatile storage devices such as a hard disk and an SSD. The drive 715 provides a physical storage area for reading and writing data according to a write command and a read command issued from the host 702.

Figure 8:
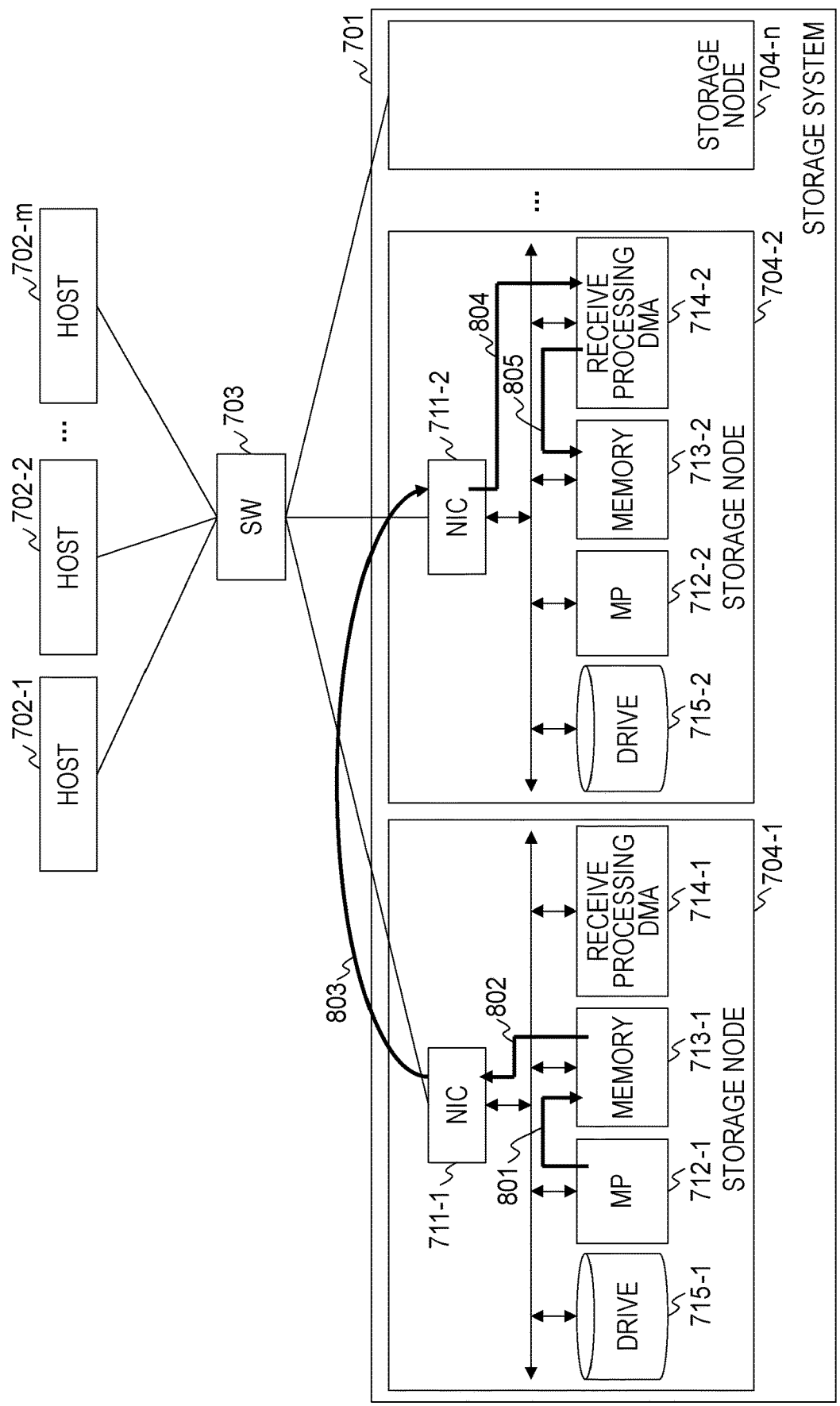
FIG. 8 is a diagram for explaining a control data transfer method in the storage system according to the second embodiment.

FIG. 8 is a diagram for explaining a control data transfer method in the storage system 701 according to the second embodiment.

In the storage system 701 according to the second embodiment, user data and control data are transferred between the storage nodes 704. As a control data transfer method according to the second embodiment, there is a transfer method similar to transfer method 1 and transfer method 2.

FIG. 8 illustrates a control flow corresponding to (transfer method 2). The following is an example of a case where control data is transferred from the storage node 704-1 to the storage node 704-2.

When a transfer request of control data is generated in the storage node 704-1, an MP 712-1 stores the control data to be transferred in a control data send buffer of the memory 713-1 (flow 801). The MP 712-1 performs control to transmit a write request including a plurality of control data.

An NIC 711-1 reads a plurality of control data stored in the control data send buffer (flow 802). The NIC 711-1 transmits the read control data to an NIC 711-2 of the storage node 704-2 via the switch 703 (flow 803).

The NIC 711-2 transfers the plurality of control data received from the NIC 711-1 to the buffer memory of a receive processing DMA 714-2 (flow 804).

The receive processing DMA 714-2 writes the plurality of received control data in a memory 713-2 (flow 805).

A packet 401 is used for the transfer of control data between the storage nodes 704. When receiving the packet 401, the receive processing DMA 714 reads the control data from a Payload 411 and writes the control data in the memory 713 as in the first embodiment.

A method in which the receive processing DMA 714 processes the packet 401 received from the NIC 711 is the same as that in the first embodiment (FIG. 6), and thus the description thereof is omitted.

Figure 9:
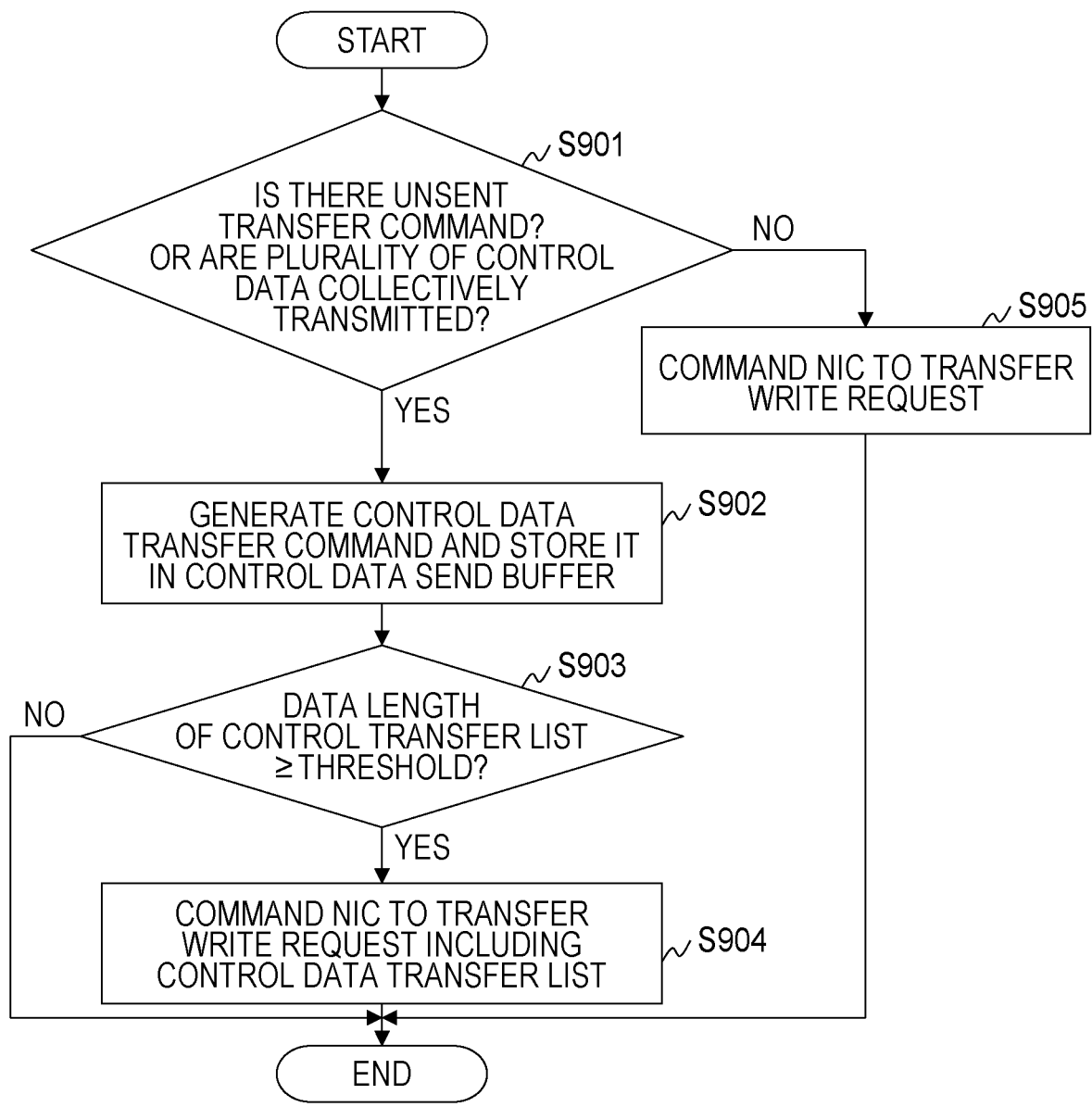
FIG. 9 is a flowchart illustrating an example of the processing executed by a storage node as the transfer source of control data according to the second embodiment.

FIG. 9 is a flowchart illustrating an example of the processing executed by the storage node 704 as the transfer source of control data according to the second embodiment.

In a case where a control data transfer request is generated, the storage node 704 executes processing described below.

The MP 712 determines whether there is an unsent control data transfer command 421 in the control data send buffer or whether it is necessary to collectively transmit a plurality of control data (step S901).

For example, the MP 712 checks the utilization rate of the network between the storage node 704 and determines that it is necessary to collectively transmit a plurality of control data when the utilization rate is high.

When there is no unsent control data transfer command 421 in the control data send buffer and it is not necessary to collectively transmit a plurality of control data, the MP 712 generates the packet 301 for transferring one control data as a write request and instructs the NIC 711 to transfer the write request (step S905). Thereafter, the MP 712 ends the processing.

The address of the memory 713 of the storage node 704 at the transfer destination is stored in the RETH 312 of the packet 301.

When the utilization rate of the network is low, that is, when there is a margin in the bandwidth between the storage node 704, there is no need to improve the throughput. Therefore, the storage node 704 transfers control data to another storage node 704 without accumulating the control data. In this case, the storage node 704 at the transfer destination writes the received control data in the memory 713. As a result, the latency of control data transfer can be improved.

When the unsent control data transfer command 421 exists in the control data send buffer or the plurality of control data need to be collectively transmitted, the MP 712 generates the control data transfer command and stores the control data transfer command 421 in the control data send buffer (step S902). At this time, the MP 712 connects the control data transfer command 421 to the end of the control data transfer list.

The MP 712 determines whether or not the data length of the control data transfer list is a threshold value or more (step S903).

When the data length of the control data transfer list is smaller than the threshold value, the MP 712 ends the processing. As described above, the MP 712 does not transfer the control data until the data length of the control data transfer list becomes equal to or greater than the threshold value. Note that a predetermined waiting time may be provided for the transfer of the control data transfer list, and even if the data length of the control data transfer list does not reach the threshold in step S903, the control data transfer list may be transferred in a case where the predetermined time has elapsed.

When the data length of a control data transfer list is equal to or greater than the threshold, the MP 712 generates the packet 401 for transferring a plurality of control data as a write request and instructs the NIC 125 to transfer the write request (step S904). Thereafter, the MP 712 ends the processing.

The address of the buffer memory of the receive processing DMA 714 of the storage node 704 at the transfer destination is stored in the RETH 312 of the packet 401.

According to the second embodiment, similarly to the first embodiment, the transfer efficiency of control data between the storage nodes 704 can be improved, and the throughput of the storage system can be improved.

Third Embodiment

The third embodiment will exemplify a control data transfer method in a storage system having a cluster configuration in which a plurality of storage nodes having a dual controller configuration are connected.

In the following description and drawings, an internal network of a storage system in which a plurality of storage nodes are connected is referred to as an internal network.

Figure 10:
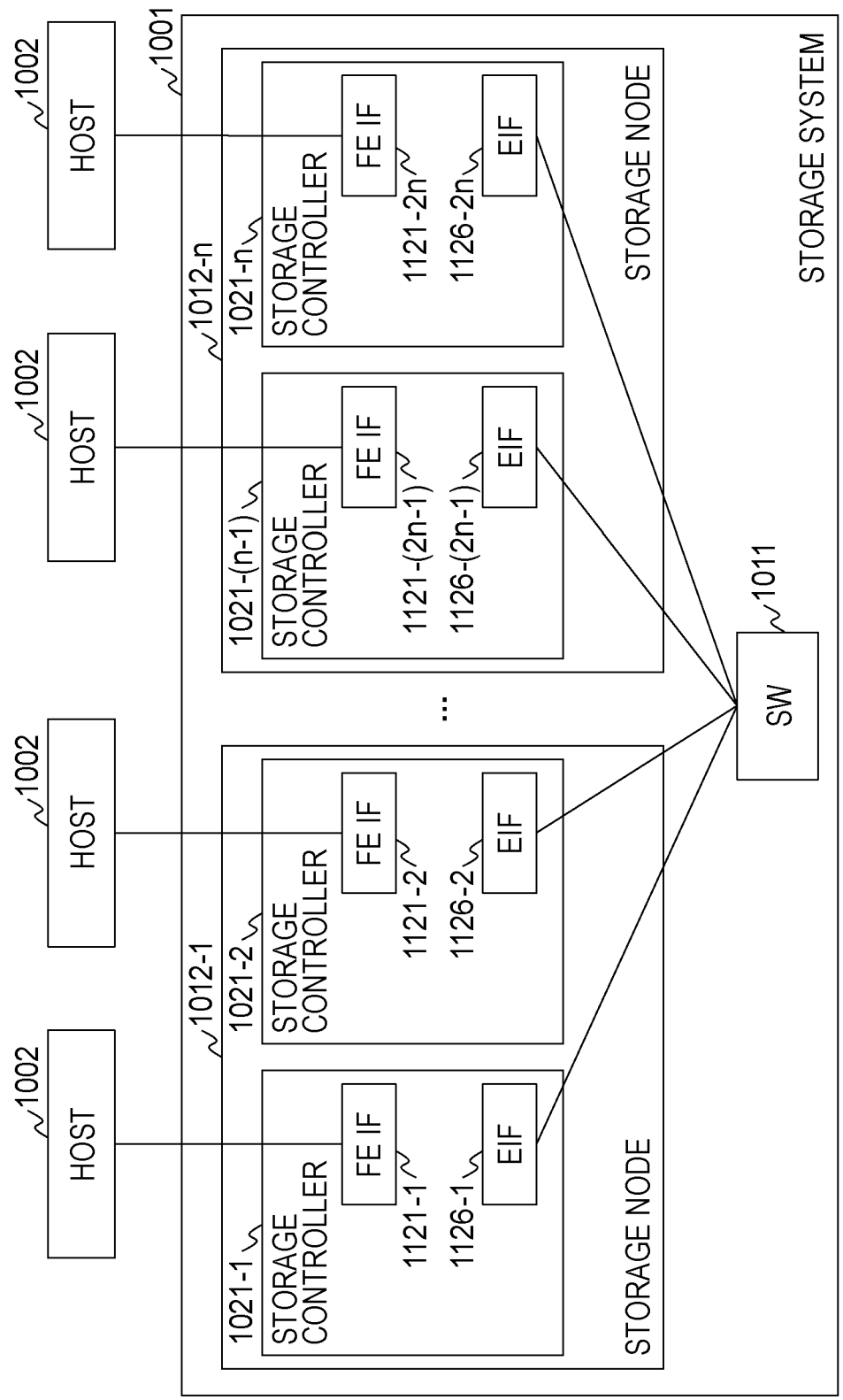
FIG. 10 illustrates an example of the configuration of a storage system of a third embodiment.

FIG. 10 illustrates an example of the configuration of a storage system according to the third embodiment.

A storage system 1001 includes a plurality of storage nodes 1012. The storage nodes 1012 are connected to each other via an internal network constructed using a switch 1011 and the link conforming to the Ethernet standard. Note that the number of switches 1011 included in the internal network is not limited.

FIG. 10 illustrates the storage system 1001 including N storage nodes 1012. Here, N is an integer of 2 or more. Note that the present invention is not limited to the number of storage nodes 1012 included in the storage system 1001.

The storage node 1012 includes two storage controllers 1021. Note that the number of storage controllers 1021 included in the storage node 1012 is arbitrary.

The storage controller 1021 includes an edge interface (EIF) 1126 for connection with the switch 1011 and an FE IF 1121 for connection with a host 1002. The details of the EIF 1126 will be described later with reference to FIG. 12. Other components of the storage controller 1021 will be described later with reference to FIG. 11. The storage controllers 1021 having different configurations may be mixed in the storage node 1012.

The host 1002 is a computer device that transmits a data read command and a data write command to the storage system 1001 based on a user operation or an operation such as application software. Referring to FIG. 10, the hosts 1002 are connected to the storage controllers 1021 one by one. However, this is not exhaustive, and a plurality of hosts may be connected to each storage controller 1021. Note that the host 1002 may be a virtual computer device such as a virtual machine.

Figure 11:
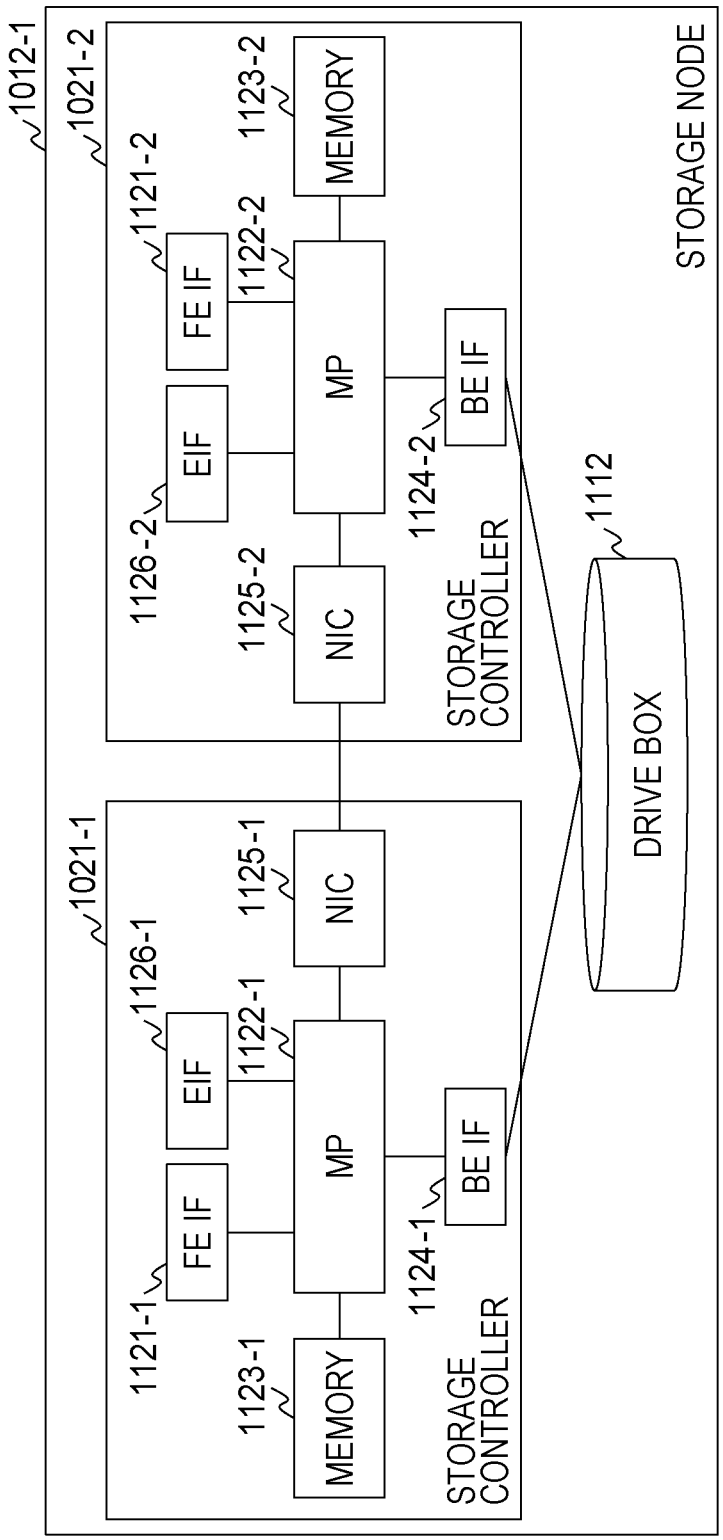
FIG. 11 is a diagram illustrating an example of the hardware configuration of a storage node according to the third embodiment.

FIG. 11 is a diagram illustrating an example of the hardware configuration of the storage node 1012 according to the third embodiment.

A storage node 1012-1 includes two storage controllers 1021 and a drive box 1112 that accommodates a plurality of storage devices. The drive box 1112 is the same as the drive box 112.

The storage controller 1021 includes the FE IF 1121, an MP 1122, a memory 1123, a BE IF 1124, an NIC 1125, and an EIF 1126.

The FE IF 1121, the MP 1122, the memory 1123, the BE IF 1124, and the NIC 1125 are the same as the FE IF 121, the MP 122, the memory 123, the BE IF 124, and the NIC 125. However, the memory 1123 according to the third embodiment does not include the control data send buffer 131.

Figure 12:
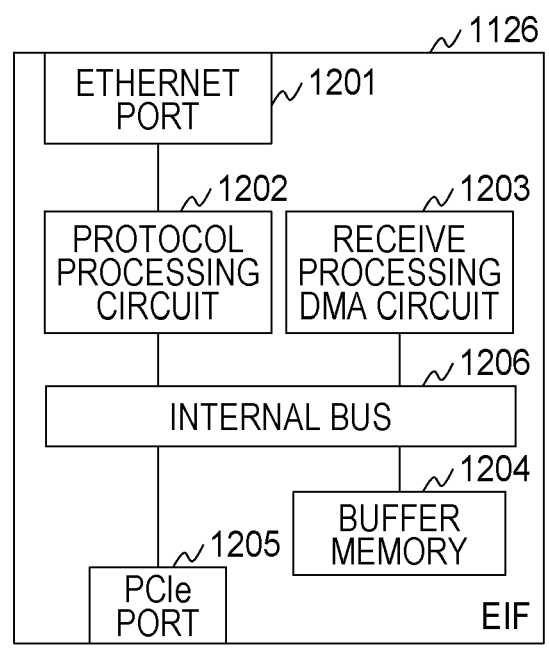
FIG. 12 is a diagram illustrating an example of the hardware configuration of an edge interface according to the third embodiment.

FIG. 12 is a diagram illustrating an example of the hardware configuration of the EIF 1126 according to the third embodiment.

The EIF 1126 includes an Ethernet port 1201, an internal network protocol processing circuit 1202, a receive processing DMA circuit 1203, a buffer memory 1204, and a PCIe port 1205. The hardware elements are connected via an internal bus 1206.

The Ethernet port 1201 connects with the switch 1011 that forms an internal network. In the present embodiment, the internal network is RoCE, but is not limited to RoCE. For example, the internal network may include Infiniband.

The internal network protocol processing circuit 1202 is a circuit for processing an internal network protocol constituting the storage system 1001.

The receive processing DMA circuit 1203 is a circuit that executes processing similar to that of the receive processing DMA 126 according to the first embodiment. The storage controller 1021 can transfer a plurality of control data at a time by using a packet 401 in internal networks interconnected via a switch 1211.

The buffer memory 1204 temporarily stores the control data received by the receive processing DMA circuit 1203.

The PCIe port 1205 connects the EIF 1126 and the MP 1122.

The storage controller 1021 transfers the packet 401 received from the storage node 1012 of the other system to the receive processing DMA circuit 1203 in the EIF 1126. The receive processing DMA circuit 1203 receives the packet 401 and performs a process (FIG. 6) similar to the receive processing DMA 126 according to the first embodiment.

Further, the MP 1122 generates the packet 401 in order to transfer a plurality of control data to the storage node 1012 of the other system. The MP 1122 generates the packet 401 using the method described with reference to FIG. 5 or 9.

According to the third embodiment, the transfer efficiency of control data between the storage nodes 1012 can be improved, and the throughput of the storage system 1001 can be improved.

In addition, the present invention is not limited to above-described embodiments and includes various modifications. For example, the above-described embodiment has been described in detail for easy understanding of the present invention, and is not necessarily limited to one having all the configurations described above. Moreover, it is possible to add, remove, and replace other configurations with respect to part of the configurations of each embodiment.

In addition, some or all of the above-described configurations, functions, processing units, processing means, and the like may be implemented by hardware, for example, by designing with an integrated circuit. In addition, the present invention can also be implemented by the program codes of software that implements the functions of the embodiments. In this case, a storage medium in which the program codes are recorded is provided to a computer, and a processor included in the computer reads out the program codes stored in the storage medium. In this case, the program codes themselves read from the storage medium implement the functions of the above-described embodiment, and the program codes themselves and the storage medium storing the program codes constitute the present invention. As a storage medium for supplying such program codes, for example, a flexible disk, a CD-ROM, a DVD-ROM, a hard disk, a solid state drive (SSD), an optical disk, a magneto-optical disk, a CD-R, a magnetic tape, a non-volatile memory card, a ROM, or the like is used.

In addition, the program codes for implementing the functions described in the present embodiment can be implemented by a wide range of programs or script languages such as assembler, C/C++, perl, Shell, PHP, Python, and Java (registered trademark).

Furthermore, the program codes of software that implements the functions of the embodiments may be distributed via a network to be stored in a storage means such as a hard disk or a memory of a computer or a storage medium such as a CD-RW or a CD-R, and a processor included in the computer may read and execute the program codes stored in the storage means or the storage medium.

In addition, in the above embodiments, the control lines and the information lines indicate what is considered to be necessary for the description, and do not necessarily indicate all the control lines and the information lines in terms of products. All the configurations may be connected to each other.

What is claimed is:

1. A storage system comprising a plurality of storage controllers,
   a first storage controller of the plurality of storage controllers including a processor, a memory, and a transfer device that processes control data for controlling an internal operation of the storage system, the control data being transmitted and received between the plurality of storage controllers,
   the processor configured to perform operations of
   (i) checking a communication load on a transmission path connecting with a second storage controller of the plurality of storage controllers for transferring the control data,
   (ii) accumulating the control data in the memory when a transfer request for the control data is generated and when the communication load on the transmission path is greater than or equal to a first predetermined threshold,
   (iii) generating, when a data amount of the control data accumulated in the memory is greater than or equal to a second predetermined threshold, a write request for transmitting a plurality of control data comprising at least the control data accumulated in the memory, and
   (iv) transmitting the write request to the second storage controller, wherein the transfer device is configured to write the plurality of control data included in the write request to the memory upon receiving the write request.

2. The storage system according to claim 1, wherein the control data is variable-length data,
the processor generates, for each of the control data, a transfer command including an address of a write destination of the control data, a data length of the control data, and the control data and generates the write request by concatenating transfer commands generated for the control data, and
the transfer device selects one of the transfer commands, reads out the control data from the transfer command based on a data length of the control data included in the selected transfer command, and writes the read control data to an address of a write destination of the control data included in the selected transfer command.

3. The storage system according to claim 1, wherein the first storage controller includes a buffer memory accessible by the transfer device, and
the processor transmits the write request to the buffer memory of the second storage controller.

4. A method for transferring data executed by a storage system in which the storage system includes a plurality of storage controllers, a first storage controller of the plurality of storage controllers including a processor, a memory, and a transfer device that processes control data for controlling an internal operation of the storage system, the control data being transmitted and received between the plurality of storage controllers, the method for transferring data comprising:
a first step of causing the processor to check a communication load on a transmission path connecting with a second storage controller of the plurality of storage controllers for transferring the control data and accumulate the control data in the memory when a transfer request for the control data is generated and when the communication load on the transmission path is greater than or equal to a first predetermined threshold;
a second step of causing the processor to generate, when a data amount of the control data accumulated in the memory is greater than or equal to a second predetermined threshold, a write request for transmitting a plurality of control data comprising at least the control data accumulated in the memory and transmit the write request to the second storage controller; and
a third step of causing, upon receiving the write request, the transfer device to write the plurality of control data included in the write request to the memory.

5. The method for transferring data according to claim 4, wherein
the control data is variable-length data,
the second step includes causing the processor to generate, for each of the control data, a transfer command including an address of a write destination of the control data, a data length of the control data, and the control data, and causing the processor to generate the write request by concatenating transfer commands generated for the control data, and
the third step includes causing the transfer device to select one of the transfer commands, causing the transfer device to read out the control data from the transfer command based on a data length of the control data included in the selected transfer command, and causing the transfer device to write the read control data to an address of a write destination of the control data included in the selected transfer command.

6. The method for transferring data according to claim 4, wherein
the first storage controller includes a buffer memory accessible by the transfer device, and
the second step includes causing the processor to transmit the write request to the buffer memory of the second storage controller.

7. A storage system comprising a plurality of storage nodes,
a first storage node of the plurality of storage nodes including a processor, a memory, and a transfer device that processes control data for controlling an internal operation of the storage system, the control data being transmitted and received between the plurality of storage nodes,
the processor configured to perform operations of
(i) checking a communication load on a transmission path connecting with a second storage node of the plurality of storage nodes for transferring the control data,
(ii) accumulating the control data in the memory when a transfer request for the control data is generated and when the communication load on the transmission path is greater than or equal to a first predetermined threshold,
(iii) generating, when a data amount of the control data accumulated in the memory is greater than or equal to a second predetermined threshold, a write request for transmitting a plurality of control data comprising at least the control data accumulated in the memory, and
(iv) transmitting the write request to the second storage node, and
the transfer device writing the plurality of control data included in the write request to the memory upon receiving the write request.

8. The storage system according to claim 7, wherein the control data is variable-length data,
the processor generates, for each of the control data, a transfer command including an address of a write destination of the control data, a data length of the control data, and the control data and generates the write request by concatenating transfer commands generated for the control data, and
the transfer device selects one of the transfer commands, reads out the control data from the transfer command based on a data length of the control data included in the selected transfer command, and writes the read control data to an address of a write destination of the control data included in the selected transfer command.

9. The storage system according to claim 7, wherein the first storage node includes a buffer memory accessible by the transfer device, and
the processor transmits the write request to the buffer memory of the second storage node.

* * * * *